United States Patent [19]

Pazzaglia

[11] Patent Number: 4,830,094
[45] Date of Patent: May 16, 1989

[54] METHOD OF COOLING THE CONTINUOUS SHIELDING WIRE FED TO THE WELDING ROLLERS OF MACHINES FOR SEAM-WELDING DISCRETE LENGTHS OF TUBE

[75] Inventor: Luigi Pazzaglia, Bologna, Italy
[73] Assignee: Cefin S.p.A., Bologna, Italy
[21] Appl. No.: 10,916
[22] Filed: Feb. 4, 1987

[30] Foreign Application Priority Data
Feb. 18, 1986 [IT] Italy ................... 3335 A/86

[51] Int. Cl.⁴ .................. B23K 11/06; B23K 11/30; F28F 5/02
[52] U.S. Cl. ........................... 165/2; 165/47; 165/64; 165/89; 219/81; 219/83
[58] Field of Search ........... 165/2, 47, 89; 219/64, 219/81, 82, 83, 84, 155; 72/200, 201; 148/12 B

[56] References Cited

U.S. PATENT DOCUMENTS

| | | | |
|---|---|---|---|
| 2,890,037 | 6/1959 | Rendel | 165/89 |
| 3,277,686 | 10/1966 | James et al. | 72/201 |
| 4,476,371 | 10/1984 | Schreiber | 219/81 |
| 4,536,636 | 8/1985 | Opprecht et al. | 219/81 |
| 4,572,937 | 2/1986 | Opprecht et al. | 219/81 |
| 4,638,851 | 1/1987 | Makihara et al. | 165/89 |
| 4,652,720 | 3/1987 | Opprecht | 219/82 |

FOREIGN PATENT DOCUMENTS

| | | | |
|---|---|---|---|
| 0136513 | 4/1985 | European Pat. Off. | |
| 0194608 | 9/1986 | European Pat. Off. | |
| 3515833 | 3/1986 | Fed. Rep. of Germany | |
| 0189080 | 10/1984 | Japan | 219/83 |
| 0381438 | 5/1973 | U.S.S.R. | 72/201 |
| 1569060 | 6/1980 | United Kingdom | 219/81 |

Primary Examiner—Albert W. Davis, Jr.
Assistant Examiner—John K. Ford
Attorney, Agent, or Firm—Balogh, Osann, Kramer, Dvorak, Genova & Traub

[57] ABSTRACT

The invention disclosed provides an effective and comprehensively economic method of cooling the continuous shielding wire fed to the welding rollers of a machine for seam-welding discrete lengths of tube, inasmuch as the wire does not merely pass between the cooled mill rolls but is wrapped around each one to the point of subtending an angle greater than 180°.

2 Claims, 1 Drawing Sheet

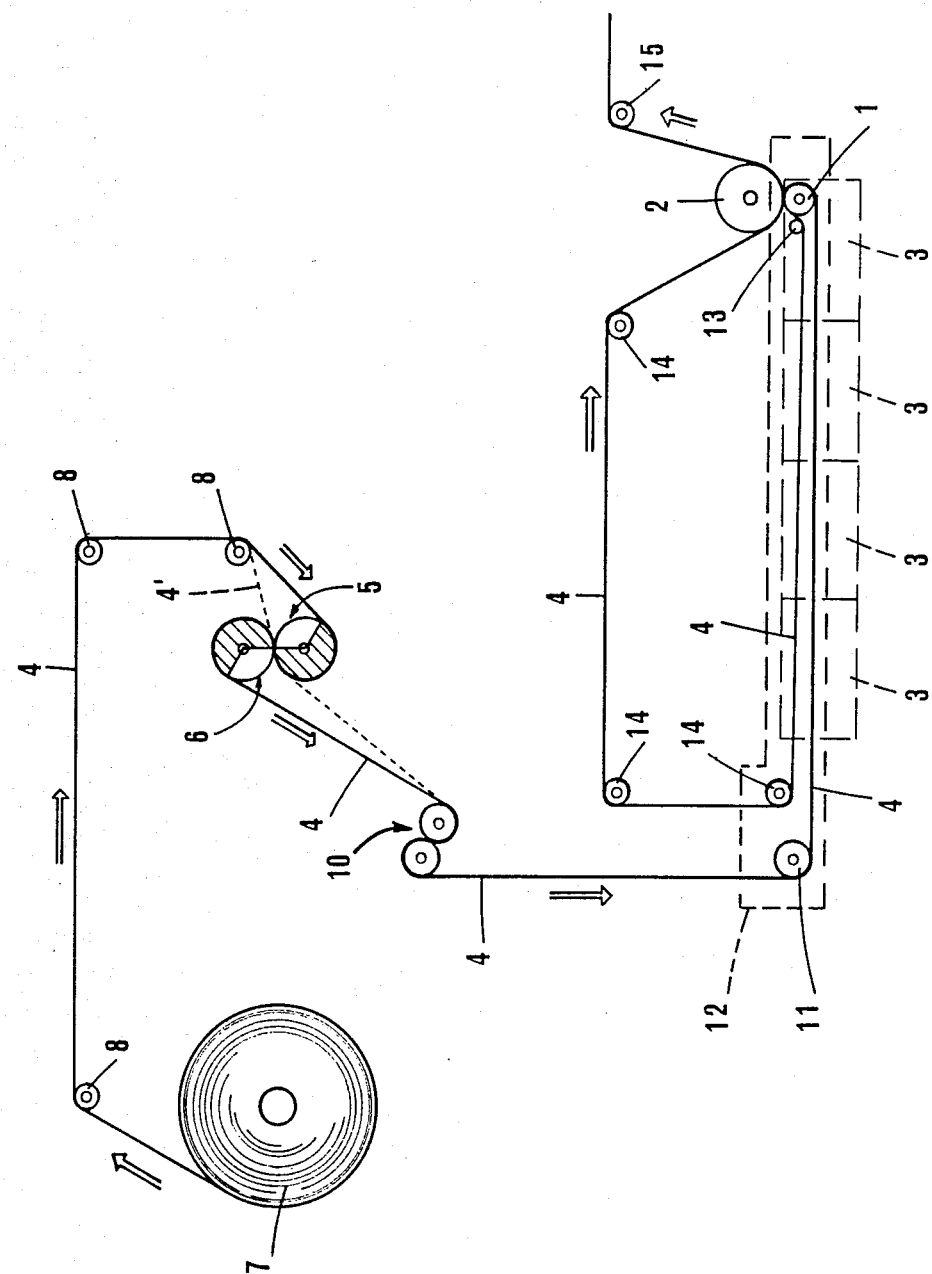

METHOD OF COOLING THE CONTINUOUS SHIELDING WIRE FED TO THE WELDING ROLLERS OF MACHINES FOR SEAM-WELDING DISCRETE LENGTHS OF TUBE

BACKGROUND of the INVENTION

The invention relates to a method of cooling the continuous shielding wire fed to the welding rollers of machines used for seam-welding discrete lengths of tube. Such machines are provided with a pair of cooled mill rolls at a point upstream of the welding rollers, in relation to the direction of the wire feed, between which the continuous wire is passed and rolled flat.

Conventional machines used for welding the longitudinal seams of tin cans are provided with a horizontal arm, one end of which is in receipt of metal strip, either in continuous format or discrete lengths; the strip material is fed in at right angles to the arm and folded piece by piece into tubular shape, with the longitudinal edges overlapping.

The discrete lengths of tube are then conveyed along the arm toward its remaining end where two welding rollers, located opposite one another outside and inside of the embodied tube, proceed to seam-weld the two longitudinal edges together, the necessary heat being generated by passage of electric current between the rollers and the welded material (Joule effect).

In order to prevent inordinate wear on the welding rollers, and to avoid their being fouled excessively through contact with the tinned material from which the cans are fashioned, the rollers themselves are shielded by a continuous conductive wire that makes direct contact with the overlapping longitudinal edges of the folded length of tube and thus ensures that the welding rollers stay clean.

Before reaching the welding rollers, the continuous wire (initially circular in section) passes through a pair of cooled mill rolls that spread it in order to produce a flat cross section, thereby increasing the surface area by way of which contact is made with the longitudinal edges of the discrete length of tube and ensuring, clearly, that a faultless overlap is maintained at the weldment.

One problem which besets the use of the continuous wire shield is that of excessive heat generated in the wire itself during the welding process. This heat causes the wire to stretch inordinately, with the result that tension becomes difficult to control.

A method and apparatus designed to overcome the problem are disclosed in application for European Patent No. 122333, which claims the adoption of a drum or cylinder around which the wire is wrapped for cooling purposes, located immediately upstream of the first welding roller, and at a point between the first and second welding rollers.

Whilst a method of this type is able to bring about a marked reduction in the temperature of the wire, it obviously calls for utilization of an entirely separate piece of apparatus, which can be exploited solely for this express purpose.

Accordingly, the object of the invention disclosed is to eliminate the drawback mentioned above, in a simple and economical manner.

SUMMARY of the INVENTION

The stated object is achieved by adoption of the method disclosed, the essential feature of which is that the continuous wire is wrapped around the mill rolls, which will be installed and cooled as a matter of course, rather than passing directly between them; thus, the wire runs off the rolls cooled to a lower temperature than is obtained in conventional machines.

The main advantage of the method is that of extreme simplicity, inasmuch as it can be implemented with maximum possible economy, virtually no expense being involved.

The method is carried into effect simply alterating the path that is normally followed by the continuous wire through the mill rolls, these being cooled as a matter of course in order to attenuate the temperature of the wire pressed between them.

A further advantage of the method disclosed is that it can be implemented in existing machinery at no extra cost to the purchaser.

Another advantage of the invention is that one possesses the facility of controlling the degree of cooling induced simply by varying the temperature of the coolant supplied to the mill rolls.

BRIEF DESCRIPTION OF THE DRAWING

The invention will now be described in detail, by way of example, with reference to the accompanying drawing, which provides a schematic representation of the conventional path of a continuous shielding wire through a seam-welding machine, and of the path followed according to the method disclosed, shown in broken line and bold line, respectively.

DESCRIPTION of the PREFERRED EMBODIMENT

In the drawing, 4 denotes a continuous wire serving to shield the welding rollers 1 and 2 of a machine used for seam-welding discrete lengths of tube 3.

The wire 4 is uncoiled from a supply reel 7, passed around a succession of idle rollers 8, and directed toward a pair of mill rolls 5 and 6 between which it is pressed flat in order to increase the surface area destined to make contact with the overlapping longitudinal edges of each length of tube 3 to be welded.

Once flattened, the continuous wire 4 passes through a tensioner 10 consisting in one, or as in the case of the example illustrated, in two idle rollers. The conventional path followed by the wire 4 from the idle rollers 8 through the mill rolls 5 and 6 to the tension rollers 10 is that illustrated in broken line.

The wire 4 is taken from the tensioner 10 around a further idle roller 11 located at one end of an arm 12 forming part of the welding machine proper; more exactly, the end of the arm 12 in question is made fast to the machine frame (not illustrated), and is in receipt of strip material (not illustrated), fed in at right angles to the arm 12 itself either in continuous format or in discrete lengths. At all events, discrete lengths of the strip material are folded one by one in such a way as to assume tubular shape, with their longitudinal edges overlapping.

The single length of tube, denoted 3, is conveyed along the arm 12 to the remaining, overhung end, which carries two welding rollers 1 and 2.

The wire 4 is routed longitudinally along the arm 12 to the point of reaching the first welding roller 1 (located internally of the tube 3), and passed first around this roller 1, circumscribing more than one half of its circumference, then around a further idle roller 13, and routed back along the arm 12 in the opposite direction to encounter another set of idle rollers 14.

The wire 4 is now take through a loop which departs from inside the lengths of tube 3, passing around the rollers 14, and joining the second welding roller 2, which is applied to the outer surface of the tube 3.

Once beyond the second welding roller 2, the wire 4 passes over a final idle roller 15 and out toward an ejection device (not illustrated).

With direct reference to the passage of the wire 4 through the mill rolls 5 and 6, the method according to the invention consists in wrapping the wire first around one of the rolls, say, that denoted 5, as illustrated in the drawing, directing it between the two rolls 5 and 6 in the opposite direction to that followed conventionally (broken line), then passing it around the remaining roll 6.

The path followed by the wire 4 according to the invention is illustrated in bold line, and arrowed.

With this arrangement, the wire 4 remains in contact with the mill rolls 5 and 6 for a longer duration than in conventional machinery, and, since the mill rolls themselves are cooled, it follows that the wire 4 will run off the rolls 5 and 6 at a lower temperature than would be the case in a conventional machine.

In order to obtain an even greater reduction in the temperature of the wire 4 as it leaves the mill rolls, the wire is looped around each roll 5 and 6 to the extent that an angle greater than 180° is subtended on each roll; the cross-hatched areas of the mill rolls 5 and 6 illustrate this feature.

Observing the drawing, it will be appreciated that the angle subtended by passage of the wire 4 around the mill rolls 5 and 6 might be increased even to the point where the stretch passing over the second roll 6 or the first roll 5 all but makes contact with the stretch approaching the first roll 5 or running off the second roll 6, respectively.

Practical experiments conducted by the applicant have shown that it is possible to obtain reductions in temperature of the wire at the exit from the mill rolls (quantifiable at 8°... 10° C. less than with a traditional installation) sufficient to ensure that the wire 2 leaves the second welding roller 2 at a temperature marginally less than that required for smooth operation of the welding machine.

In a machine equipped such as to permit of carrying the invention into effect, the temperature of the wire 4 leaving the second welding roller 2 can be reduced further still by appropriate regulation of the temperature of coolant supplied to the mill rolls 5 and 6.

A further reduction in temperature of the wire 4 leaving the second welding roller 2 might also be obtained by increasing the diameter of the mill rolls 5 and 6.

It will be clear from the above description that implementation of the method disclosed is simple and economic in the extreme, with ex-works and existing machinery alike.

What is claimed:

1. Method of cooling the continuous shielding wire fed to the welding rollers of machines for seam-welding discrete lengths of tube, comprising the step of wrapping the continuous wire around at least one of a pair of cooled mill rolls, located upstream of the welding rollers in relation to the direction in which the wire is fed, before it is passed between the same two rolls and flattened, in such a way as to subtend an angle greater than 180°.

2. Method as in claim 1, wherein the continuous wire is wrapped around one of the mill rolls before passing between the same two rolls, and then wrapped around the remaining mill roll following its passage between the two in such a way to subtend for each roll an angle greater than 180°.

* * * * *